(12) United States Patent  
Seizinger

(10) Patent No.: US 7,715,932 B2
(45) Date of Patent: May 11, 2010

(54) METHOD AND APPARATUS FOR CONTROLLING A SAFETY-CRITICAL PROCESS

(75) Inventor: Dietmar Seizinger, Ostfildern (DE)

(73) Assignee: Pilz GmbH & Co., Ostfildern (DE)

( * ) Notice: Subject to any disclaimer, the term of this patent is extended or adjusted under 35 U.S.C. 154(b) by 543 days.

(21) Appl. No.: 11/254,133

(22) Filed: Oct. 19, 2005

(65) Prior Publication Data

US 2006/0190101 A1  Aug. 24, 2006

Related U.S. Application Data

(63) Continuation of application No. PCT/EP2004/003852, filed on Apr. 10, 2004.

(30) Foreign Application Priority Data

May 2, 2003 (DE) ................. 103 20 522

(51) Int. Cl.
*G05B 9/02* (2006.01)
(52) U.S. Cl. ............................... 700/79; 700/1; 700/206
(58) Field of Classification Search ................... 700/79, 700/1, 206
See application file for complete search history.

(56) References Cited

U.S. PATENT DOCUMENTS

| 4,638,120 A | 1/1987 | Herve |
| 5,307,409 A | 4/1994 | Driscoll |
| 5,612,683 A * | 3/1997 | Trempala et al. ........... 340/5.23 |
| 2002/0040252 A1 | 4/2002 | Behr et al. |
| 2002/0126620 A1 | 9/2002 | Heckel et al. |

FOREIGN PATENT DOCUMENTS

| DE | 37 06 325 A1 | 9/1988 |
| DE | 197 42 716 A1 | 4/1999 |
| DE | 199 28 517 A1 | 1/2001 |
| JP | 58-215840 | 12/1983 |
| JP | 2-180443 | 7/1990 |
| JP | 2-186734 | 7/1990 |
| JP | 2000-224089 | 8/2000 |
| WO | WO 03040869 A2 * | 5/2003 ................... 726/4 |

OTHER PUBLICATIONS http://web.archive.org/web/20020318192236/http://www.pilz.com.au/pss.htm ("Programmable Safety Systems" pp. 1-2).*
IEC; International Standard 61508-2; pp. 93 and 97.

* cited by examiner

*Primary Examiner*—Ramesh B Patel
*Assistant Examiner*—Tejal J Gami
(74) *Attorney, Agent, or Firm*—Harness, Dickey & Pierce. P.L.C.

(57) ABSTRACT

The invention relates to a method and an apparatus for controlling safety-critical processes, such as the monitoring of protective doors, emergency stop switches, light curtains and the like. A control unit is connected to a plurality of I/O units via a data transmission link. The I/O units transmit process data to the control unit, with the process data being protected against transmission errors by means of a diversitary multiple transmission. The process data are encoded using a variable keyword in order to generate variably encoded process data. The variably encoded process data are transmitted to the control unit as part of the diversitary multiple transmission.

24 Claims, 3 Drawing Sheets

METHOD AND APPARATUS FOR CONTROLLING A SAFETY-CRITICAL PROCESS

CROSSREFERENCES TO RELATED APPLICATIONS

The present application is a continuation of co-pending international patent application PCT/EP2004/003852, filed on Apr. 10, 2004 and published as WO 2004/097539 A1 in German language, which international application claims priority under the Paris convention from German patent application 103 20 522.5, filed on May 2, 2003.

BACKGROUND OF THE INVENTION

The present invention relates to a method and an apparatus for controlling a safety-critical process. More particularly, the invention relates to a method and an apparatus for an improved process data transmission in safety-critical process control.

Safety-critical processes within the meaning of the present invention are technical sequences, relationships and/or events for which faultless operation needs to be ensured in order to avoid any risk to people or material objects of value. In particular, this involves the monitoring and control of operations taking place automatically in the field of mechanical and plant engineering in order to prevent accidents. Classic examples are the safeguarding of a press brake installation, the safeguarding of automatically operating robots, or ensuring a safe state for maintenance work on a technical installation. For such processes, European standard EN 954-1 classifies safety categories from 1 to 4, where 4 is the highest safety category. The present invention particularly relates to safety-critical processes for which at least category 3 from EN 954-1 or a comparable standard needs to be met.

The control of safety-critical processes requires the devices and components involved in the control to have intrinsic failsafety. This means that even if the safety-related device fails or develops a fault the required safety, for example of the operating personnel on the mechanical installation, needs to be maintained. For this reason, safety-related installations and devices are usually of redundant design, and in a large number of countries require appropriate approval from competent supervisory authorities. As part of the approval process, the manufacturer of the safety-related device usually has to prove that the required intrinsic failsafety is in place, which is very complex and expensive due the extensive fault considerations.

DE 197 42 716 A1 discloses a prior art apparatus in which the control unit is connected to physically remote I/O units via what is called a fieldbus. The I/O units have sensors connected to them for receiving process data and also actuators for initiating control operations. Typical sensors in the field of safety technology are emergency stop switches, protective doors, two-hand switches, rotational speed sensors or light barrier arrangements. Typical actuators are contactors, which are used to deactivate the drive mechanisms in an installation which is being monitored, or solenoid valves. The I/O units in such an arrangement are essentially used as physically distributed signal pickup and signal output stations, whereas the actual processing of the process data and the generation of control signals for the actuators take place in the superordinate control unit. In many cases, the superordinate control unit used is what is known as a programmable logic controller (PLC).

To be able to use such a fieldbus-based system to control safety-critical processes, the data transmission from the I/O units to the control unit needs to be made failsafe. In particular, it is necessary to ensure that a dangerous state cannot arise in the whole installation as a result of corruption of transmitted process data and/or as a result of a fault in a remote I/O unit.

In the known system from DE 197 42 716 A1, this is done by providing "safety-related" devices both in the superordinate control unit and in the remote I/O units. This involves all signal pickup, signal processing and signal output paths being of redundant design, for example. The redundant channels monitor each other, and when a fault or an undefined state occurs the installation is transferred to a safe state, for example is disconnected. In addition, the process data are transmitted to the controller several times. In the case of the known apparatus, this is done by transmitting the binary process data once in unchanged form, a second time in negated form and a third time in the form of a checksum derived from the process data. The different manner of transmission is referred to as diversitary.

The fact that safety-related devices in the known installation are present both in the control unit and in the remote I/O units means that the actual data transmission can take place via a single-channel fieldbus. The process data are checked for safety both by the sender and by the receiver. A drawback of this approach, however, is that for all remote I/O units the required intrinsic failsafety needs to be proved as part of the approval processes. This is complex and expensive.

One alternative approach involves designing the remote I/O units to be "non-failsafe" and instead producing the data transmission link in two-channel form, i.e. with two separate signal paths. In this case, the superordinate control unit, which is of failsafe design, has the option of accessing the process data using two channels and of carrying out the necessary fault check. A drawback of this approach is that the entire data transmission link needs to be in two-channel form, which means increased wiring complexity.

DE 37 06 325 A1 discloses an apparatus in which remote I/O units are connected to the superordinate control unit via a separate disconnection path in addition to the actual fieldbus. However, this document does not reveal the extent to which the transmission of the process data from the I/O units to the controller is in failsafe form.

SUMMARY OF THE INVENTION

Against this background, it is an object of the present invention to specify an alternative method and apparatus which can be provided and implemented less expensively given the same safety requirement.

According to one aspect of the invention, this object is achieved by a method for controlling a safety-critical process, comprising the steps of:
  providing a control unit for processing safety-critical process data,
  providing an I/O unit connected to the control unit via a data transmission link, and
  transmitting the process data from the I/O unit to the control unit, with the process data being protected by means of a diversitary multiple transmission,
wherein the process data are encoded at least once using a variable encoding algorithm in order to generate variably encoded process data, and wherein the variably encoded process data are transmitted to the control unit as part of the diversitary multiple transmission.

According to another aspect, this object is achieved by an apparatus for controlling a safety-critical process, comprising a control unit for processing safety-critical process data, at least one I/O unit for remote signal input and output, and a data transmission link for connecting the at least one I/O unit to the control unit, the at least one I/O unit being adapted to generate the process data from the signal input and comprising an encoder chip which is designed to encode the process data using a variable, constantly changing keyword in order to generate variably encoded process data resulting in a defined dynamic behavior, and the at least one I/O unit being designed to transmit the variably encoded process data to the control unit by means of a diversitary multiple data transmission via the data transmission link.

The proposed solution follows on from the approach known from DE 197 42 716 A1, according to which the process data are transmitted to the control unit as part of a diversitary multiple transmission. According to one aspect of the invention, however, the diversitary is now achieved by virtue of the process data being encoded at least once using a variable keyword. In this context, encoding means that the process data, which are usually in the form of binary information, are logically combined with the variable keyword. It goes without saying that the logic combination needs to be reversible so that the superordinate control unit is able to retrieve the redundant information from the encoded process data. By way of example, the logic combination may be a logic XOR-combination of the actual process data with the variable keyword. An XOR-combination changes every bit of the process data but without losing the information. Alternatively, the process data could also be added to the keyword or logically combined with it in another way, in which case the logic combination should preferably influence every bit of the process data (in the case of binary representation).

Encoding the process data to be transmitted using a variable encoding algorithm generates a defined dynamic behavior which allows the safety function to be controlled just in the area of the superordinate control unit. It is therefore possible to dispense with a failsafe, for example, two-channel redundancy, design at the I/O unit. Accordingly, it is either not necessary to prove that the I/O units are failsafe as part of the approval processes.

On the other hand, the data transmission can continue to take place via a single-channel connection because of the now dynamic multiple transmission, and this keeps down the wiring complexity. The inventive arrangement and the corresponding method, as a whole, can thus be implemented much less expensively.

In a refinement of the invention, the variable encoding algorithm uses a variable keyword generated by the control unit and transmitted to the I/O unit.

As an alternative, it would generally also be possible to generate the variable keyword in the area of the I/O unit or at another location within the overall system. By contrast, the present refinement has the advantage that the control unit is provided with central control over the variable keyword as well, which means that all safety-critical areas are combined in the control unit. Fault considerations, safety checks and the like can therefore be concentrated on the control unit. In addition, the control unit as central unit can independently address all I/O units, so that the distribution of the variable keywords in this refinement is simpler and less complicated.

In a further refinement, the variable keyword is changed for every operation of transmitting process data to the control unit.

As an alternative, it is generally also possible to leave the variable keyword unchanged for a respective plurality of process data transmissions. The preferred refinement achieves a high level of safety, however, since the control unit can react more quickly to safety-critical situations because of the more dynamic behavior. However, it goes without saying that in the case of bursty transmission of process data to the control unit, the entire burst can be encoded using a common keyword in this refinement too in order to keep down the data traffic on the data transmission link as far as possible.

In a further refinement, the control unit reads the process data cyclically from the I/O unit.

In the terminology in this field of the art, such a refinement might be referred to as "polling". As an alternative to this, there are also what are known as "eventcontrolled" or "interrupt-controlled" systems, in which process data are requested and/or sent only when an initiating event has occurred. In the preferred refinement, the advantages of the invention are shown particularly clearly, however, because the I/O units can be designed to be technically particularly simple in these cases. The materials and development complexity for the I/O units is minimal in this refinement.

In a further refinement, the process data are encoded in the I/O unit in a separate encoder chip which preferably has a hard-wired logic section.

In the preferred exemplary embodiments, the separate encoder chip is in the form of an FPGA (Field Programmable Gate Array) or is in the form of an ASIC (Application Specific Integrated Circuit), since the proof of failsafety which is required as part of the approval processes is simpler in the case of hardware-based solutions than in the case of software-based solutions. Providing a separate encoder chip simplifies the approval process even further, since the "rest" of the I/O unit can then be produced largely independently of the inventive encoding. It is therefore easier to upgrade already existing "unintelligent" or non-safe I/O units to the inventive concept.

In a further refinement, the diversitary multiple transmission is comprised of a double transmission of the process data, said double transmission containing the variably encoded process data.

In other words, the diversitary multiple transmission now contains only the double transmission of the process data, with the process data being variably encoded once. The second time, the process data are transmitted preferably unchanged, since they are then directly available in the control unit "in plain text". The refinement has the advantage that the volume of the transmitted data is reduced to a minimum, which allows data transmission links with smaller transmission capacities. In addition, the inventive apparatus can react more quickly in this refinement, which represents an increased level of safety. One particular aspect of this refinement is that—in contrast to virtually all known safety-related systems—it is possible to dispense with the generation and transmission of checksums.

In a further refinement, the I/O unit contains an actuator output and also a separate test unit for the actuator output, with a test result from the test unit being transmitted to the control unit as a process data value.

This refinement very advantageously makes use of the options provided by the invention. Although systems with "intelligent" and failsafe I/O units are fundamentally known to check their own actuator outputs for operating safety on a regular basis, systems with "unintelligent" and non-failsafe I/O units have to date always had to have the testing of the actuator outputs initiated by the superordinate control unit. This increases the bus load and also makes it very difficult to implement switch-off tests with just small switch-off pulses on account of the signal propagation times of the data transmission link. The inventive solution now makes it possible for the control unit to use a simple command to initiate a switch-off test and to read in the result as a process data value. Very short switch-off pulses can thus be produced in situ by the I/O unit, but the actual evaluation of the results takes place in the control unit, which significantly reduces the intelligence required by the I/O unit.

It goes without saying that the features mentioned above and those yet to be explained below can be used not only in the respective indicated combination but also in other combinations or on their own without departing from the scope of the present invention.

BRIEF DESCRIPTION OF THE FIGURES

Exemplary embodiments of the invention are illustrated in the drawing and are explained in more detail in the description below. In the drawing.

DESCRIPTION OF PREFERRED EMBODIMENTS

Figure 1:
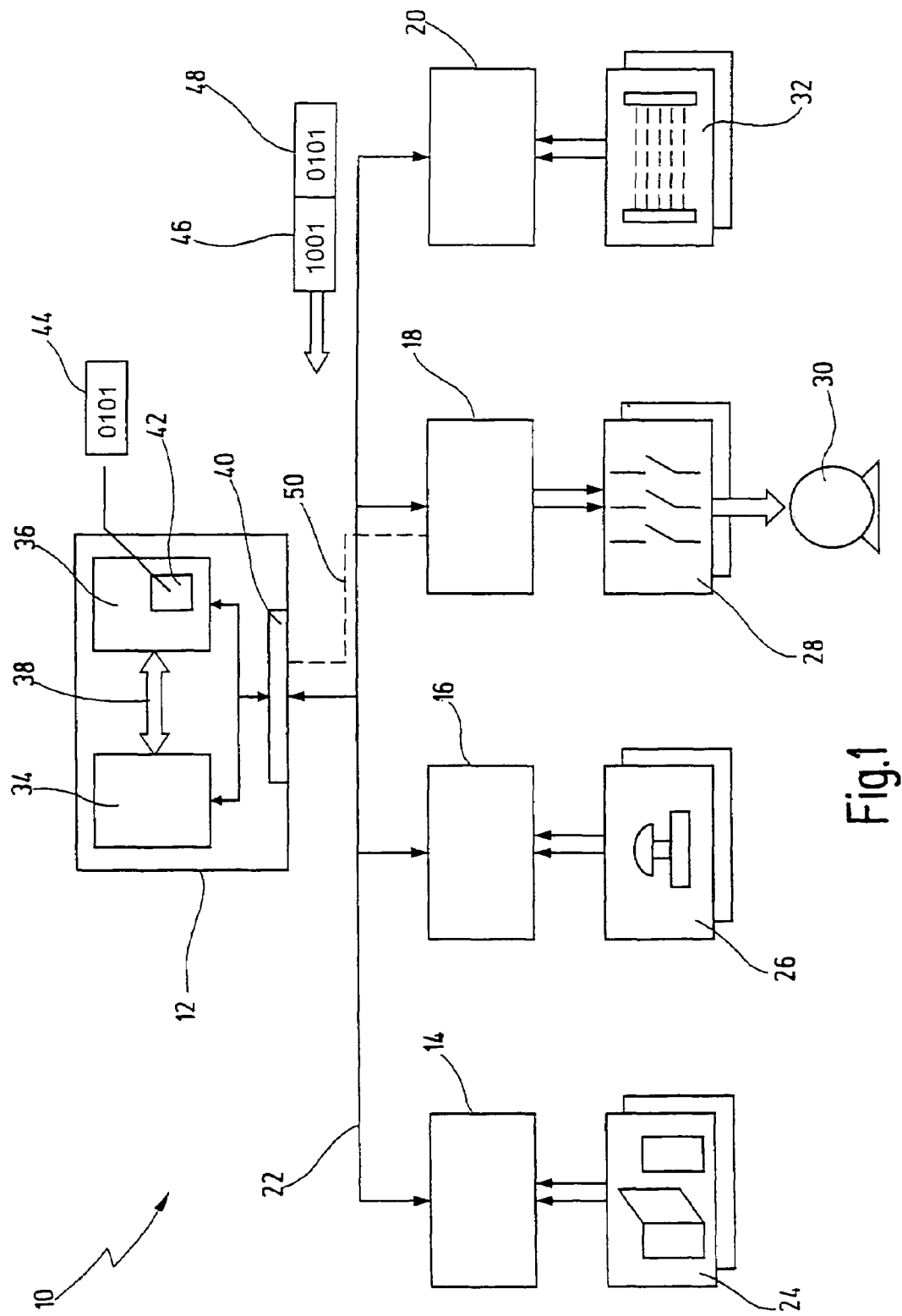
FIG. 1 shows a schematic illustration of an inventive apparatus as a block diagram.

In FIG. 1, an exemplary embodiment of an inventive apparatus is denoted in its entirety by reference numeral 10.

The apparatus 10 comprises a control unit 12, for example a failsafe PLC, as sold by the applicant of the present invention under the brand name PSS®. Preferably, however, this is a failsafe miniature controller or any other type of failsafe control unit within the meaning of the present invention (at least category 3 from EN 954-1 or comparable requirements/purposes of use).

In this case, the apparatus 10 has four I/O units 14, 16, 18, 20, shown by way of example, which are physically remote from the control unit 12 and are connected thereto via a single-channel data transmission link 22. In one exemplary embodiment, the data transmission link 22 is a fieldbus. Preferably, however, the transmission link is a simple data link without special transmission protocols on the higher levels of the OSI reference model. The I/O units 14-20 are comparatively unintelligent and non-failsafe units (non-failsafe=does not meet the requirements of category 3 or 4 from EN 954-1 or comparable requirements), as explained in more detail below with reference to FIGS. 2 and 3. They are essentially used for signal pickup and output, i.e. for reading safety-critical sensors and for activating safety-critical actuators. As an example of a typical application, the safety-critical sensors shown are a plurality of protective doors 24, emergency stop switches 26, contactors 28, which can be used to disconnect a drive mechanism 30 in failsafe fashion, and also a light curtain 32. The I/O units 14, 16 and 20 accordingly operate as input units for picking up the sensor signals, while the I/O unit 18 is used as an output unit for actuating the contactors 28. Apart from this simplified illustration, however, the I/O units 14-20 may also be combined input and output units.

The control unit 12 is designed to have multichannel redundancy in a manner which is known per se, in order to ensure the necessary intrinsic failsafety. As a simplification for the redundancy signal processing channels, the present case shows two microcontrollers 34, 36 which can interchange data via a connection 38 and are thus able to control one another. The connection 38 may be implemented as a dualported RAM, for example, but may also be implemented in any other way.

Reference numeral 40 denotes a bus interface module, i.e. a communication interface which the microcontrollers 34, 36 use to access the fieldbus 22. The same-priority access which the two microcontrollers 34, 36 have to the bus interface module 40 is again to be understood as an example in this case. Those skilled in the art are aware of alternative implementations.

In line with one preferred aspect of the present invention, the control unit 12 has a keyword generator 42 which can be implemented through suitable programming of the microcontroller 36, for example. The keyword generator 42 generates variable keywords which are used in the manner explained below to encode the process data which are to be transmitted by the I/O units 14-20.

The variable keywords can be generated using one channel, as illustrated in the present case, or else using two channels. In one preferred exemplary embodiment, the variable keywords are generated on a (quasi)random basis, which is possible using random number generators or algorithms which are known per se. As an example, a four-digit, binary keyword "0101", is shown at reference numeral 44.

To read in process data, the control unit 12 transmits the keyword 44 to the appropriate I/O unit (in this case shown for the I/O unit 20). This unit then sends the requested process data, specifically once "in plain text" and a second time in coded form in line with one preferred exemplary embodiment. By way of example, FIG. 1 shows the process data as "1001" under reference numeral 46 and the coded process data "0101" under the reference numeral 48. In this case, the process data 46 and 48 are a common part of a data telegram which the I/O unit 20 transmits to the control unit 12. Alternatively, the process data 46 and 48 may also be transmitted to the control unit 12 in separate data telegrams, however.

In representation of a preferred exemplary embodiment, the process data 46 are in this case coded by means of a XOR-combination with the keyword 44, which results in the coded process data 48.

Figure 3:
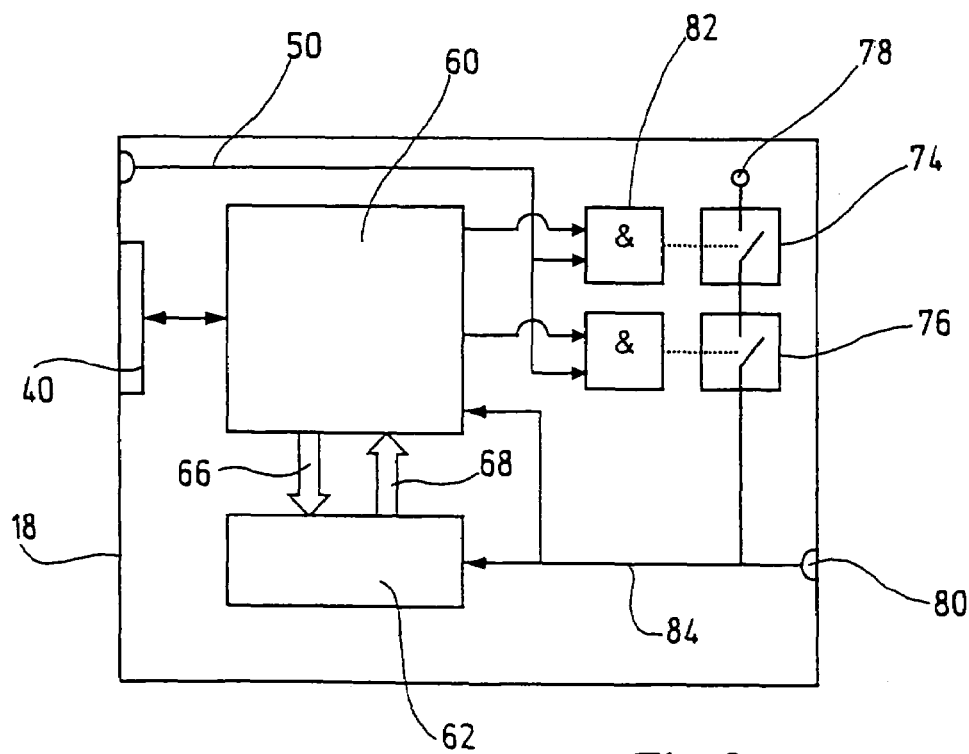
FIG. 3 shows a schematic illustration of a preferred embodiment of an I/O unit operating as an output unit.

Reference numeral 50 denotes an additional disconnection path which is explained in more detail in FIG. 3 with respect of the output unit 18. In line with one preferred exemplary embodiment, the disconnection path 50 is routed to the I/O unit 18 in a separate line.

In the text below, same reference symbols denote the same respective elements as in FIG. 1.

Figure 2:
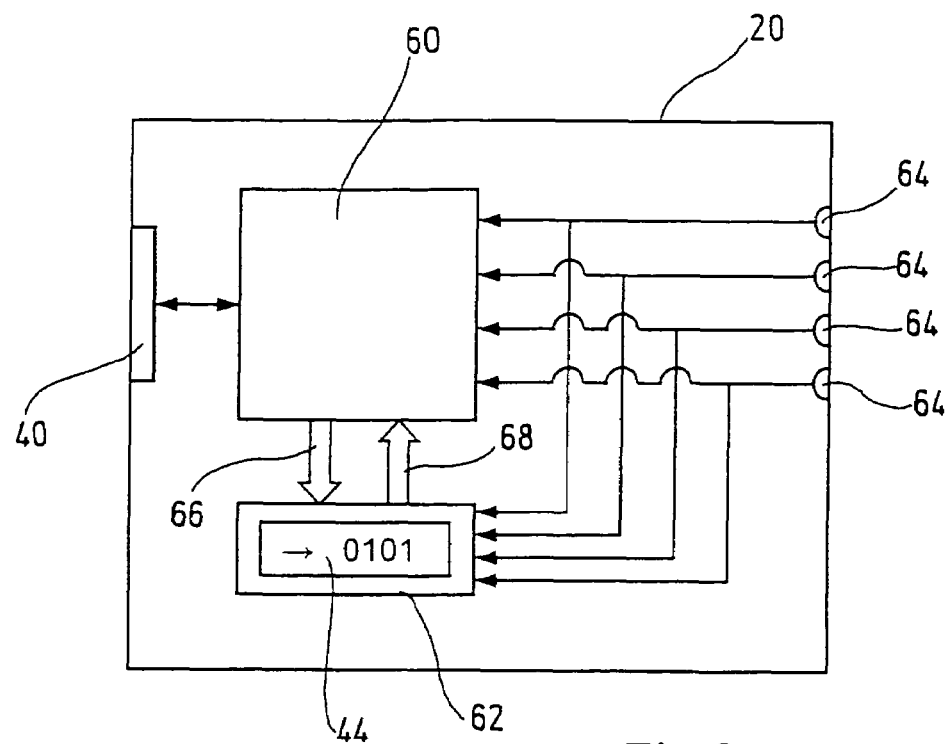
FIG. 2 shows a schematic illustration of an I/O unit operating as an input unit.

FIG. 2 shows the basic design of a preferred input unit using the example of the I/O unit 20. The I/O unit 20 contains a (single-channel, and hence non-failsafe) microcontroller 60 and also an encoder chip 62, which is separate therefrom. In line with one preferred exemplary embodiment, the encoder chip 62 is in the form of an FPGA or ASIC. As an alternative to this, the encoder chip 62 may likewise in principle be in the form of a microcontroller, however, or else may be integrated in the microcontroller 60. The reference numeral 64 denotes a plurality of signal inputs which the I/O unit 20 uses to pick up state signals from the connected light curtain(s) 32. The state signals applied to the inputs 64 are supplied in parallel both to the microcontroller 60 and to the encoder chip 62.

In the embodiment illustrated here, only the microcontroller 60 is able to access the fieldbus 22 via a bus interface module 40. For this reason, in this exemplary embodiment the microcontroller 60 picks up the keyword 44 transmitted by the control unit 12 and transmits it to the encoder chip 62 via a connection 66. The encoder chip 62 logically combines the data applied to the signal inputs 64 with the variable keyword 44 and makes the coded process data available to the microcontroller 60 again via a connection 68. The microcontroller 60 then transmits the process data which it has directly picked up and the encoded process data, as shown by way of example in FIG. 1 using reference numerals 46, 48. A continuously failsafe, two-channel redundancy design of the I/O unit 20 is not required in this case.

FIG. 3 shows a preferred design of an output unit using the example of the I/O unit 18. The I/O unit 18 likewise has a microcontroller 60 which is suitably programmed for operation as an output unit. The microcontroller 60 has a connection to an encoder chip 62 via a forward and reverse channel 66, 68. As an alternative to this, it would, in principle, also be possible for the encoder chip 62 itself to access the fieldbus 22 via the bus interface module 40 or via a dedicated bus interface module (not shown here).

In this case, the I/O unit 18 is shown in representation of a plurality of inherently known implementations with two switching elements 74, 76 arranged in series so as to be redundant with respect to one another. One connection 78 of the series circuit has an operating voltage applied to it which may be 24 volts, for example. The outputs of the switching elements 74, 76 are routed to an output 80 to which one or more contactors 28 may be connected, for example. It goes without saying that the illustration shown is simplified and exemplary and that, as a departure therefrom, there may be a plurality of outputs 80 which are actuated via a plurality of switching elements 74, 76. The microcontroller 60 opens the switching elements 74, 76 when it receives an appropriate disconnection command from the control unit 12 via the fieldbus 22.

In accordance with a preferred exemplary embodiment, a second disconnection option is provided in this case by means of the disconnection path 50. As a simplification, the disconnection path 50 is also routed to the switching elements 74, 76 via two AND gates 82. This provides the control unit 12 with the opportunity to disconnect the contactors 28 even if the microcontroller 60 in the I/O unit 18 fails.

Reference numeral 84 denotes a readback line which is supplied both to the microcontroller 60 and to the encoder chip 62. This is used to monitor the state of the switching elements 74, 76 (open or closed). The respective state is a process data value which, in line with the present invention, is read in once "in plain text" and a second time in variably encoded form by the control unit 12. This is done, in particular, when the control unit 12 transmits a test command to the I/O unit 18, whereupon said unit briefly opens the switching elements 74, 76 and then closes them again. The result of this disconnection test is then transmitted as a process data value to the control unit 12.

Figure 4:
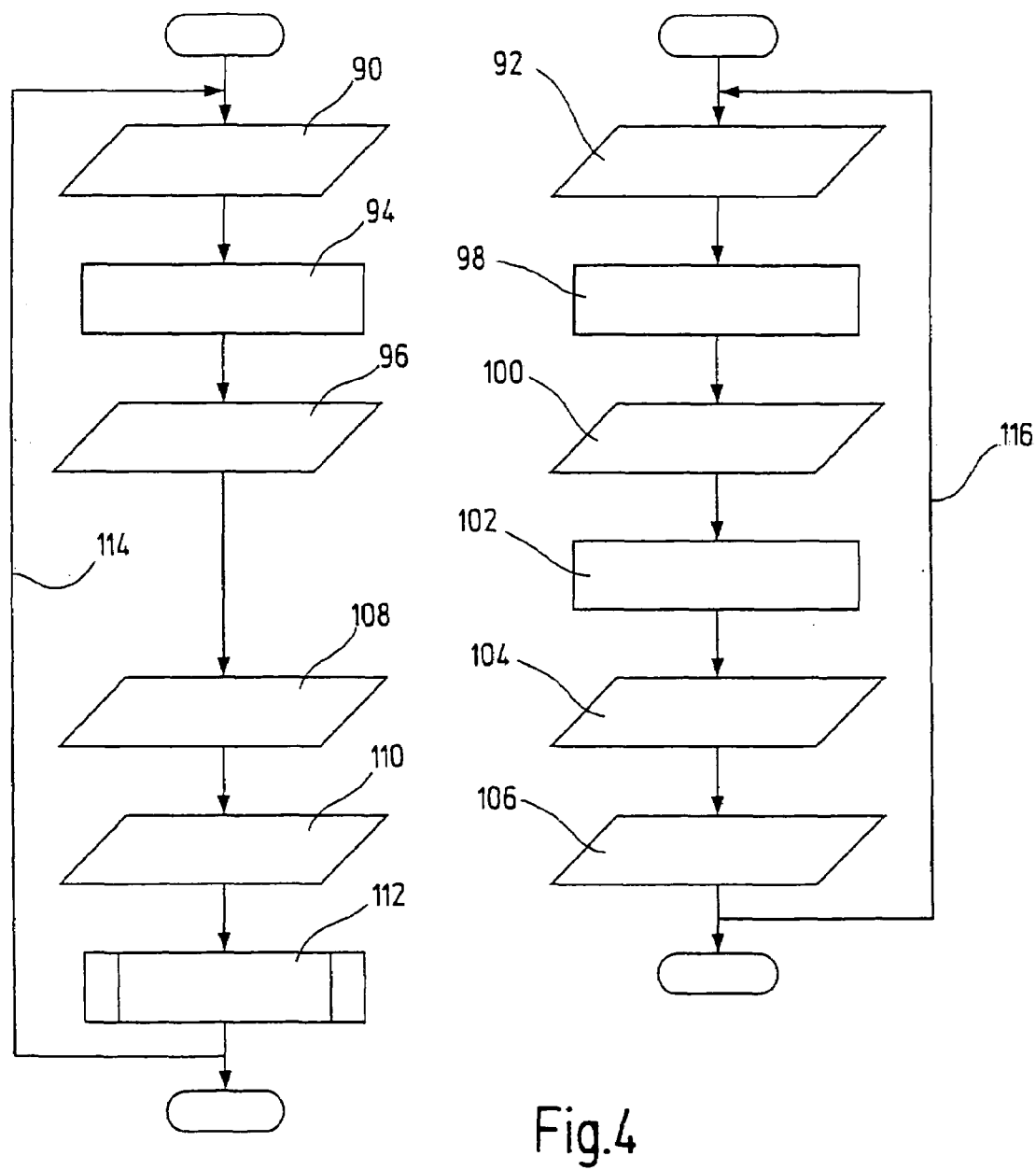
FIG. 4 shows two simplified flowcharts to explain the inventive method.

In FIG. 4, the left-hand flowchart schematically shows the sequence of the inventive method in the control unit 12, and the right-hand flowchart shows the corresponding sequence in the I/O unit 14-20.

In step 90, the control unit 12 outputs a control command, which is read in by the I/O unit 14-20 in step 92. In step 94, the control unit 12 then uses the keyword generator 42 to generate a variable (new) keyword which is transmitted to the I/O unit 14-20 in step 96. The I/O unit 14-20 for its part executes the control command received in step 92, as illustrated by reference numeral 98. This involves testing the switching elements 74, 76, for example.

In step 100, the I/O unit 14-20 reads in the newly generated keyword and in step 102 subsequently encodes the process data which are to be transmitted. In steps 104, 106, the I/O unit 14-20 then transmits the process data and the encoded process data, and the control unit 12 reads in these data in steps 108, 110. The control unit 12 then evaluates the process data received, which is shown by step 112. The two method sequences are repeated cyclically, which is shown by the arrows 114, 116. In one preferred embodiment, this cyclic sequence, in which the control unit 12 polls the I/O units 14-20, generates a constantly changing keyword and transmits it to the I/Q units 14-20. Even if the process data from the I/O units 14-20 do not change over a long period of time, which is typical for protective doors, emergency stop switches and the like, the data traffic on the fieldbus 22 changes with every polling operation, which means that the control unit 12 is able to identify a break in the data link, an I/O unit "hanging" in a static state and other faults.

What is claimed is:

1. A method for controlling a safety-critical process, comprising the steps of:
   providing a control unit for processing safety-critical process data relating to the operational state of a remote safety-critical sensor device and/or a remote safety-critical actuator device,
   providing at least one I/O unit that is connected to the safety-critical sensor device or to the safety-critical actuator device for monitoring the safety-critical sensor device or monitoring and activating the safety-critical actuator device, respectively,
   providing a data transmission link for connecting the control unit and the at least one I/O unit,
   encoding the safety-critical process data using a variable encoding algorithm in order to generate variably encoded safety-critical process data, such that said variably encoded safety-critical process data repeatedly changes even when there is no change in the safety-critical process data, and
   transmitting the variably encoded safety-critical process data from the I/O unit to the control unit via said data transmission link.

2. The method of claim 1, wherein the step of encoding the safety-critical process data uses a variable keyword that is generated by the control unit and transmitted to the at least one I/O unit.

3. The method of claim 2, wherein the variable keyword is changed for every transmission of process data from the at least one I/O unit to the control unit.

4. The method of claim 1, wherein the control unit reads the safety-critical process data cyclically from the at least one I/O unit.

5. The method of claim 1, wherein the at least one I/O unit comprises a separate encoder chip, and the safety-critical process data are encoded in the I/O unit in the separate encoder chip.

6. The method of claim 5, wherein the separate encoder chip has a hard-wired logic section for encoding the safety-critical process data with a variable keyword.

7. The method of claim 1, wherein the data transmission is part of a redundant transmission substantially comprised of a double data transmission of the safety-critical process data, said double data transmission containing the variably encoded safety-critical process data.

8. The method of claim 1, wherein the I/O unit comprises an actuator output and a separate test unit for the actuator output, with a test result from the test unit being transmitted to the control unit as a process data value.

9. A method for controlling a safety-critical process, comprising the steps of:

providing a control unit for processing safety-critical process data relating to the operational state of a remote safety-critical sensor device and/or a remote safety-critical actuator device, providing an I/O unit connected to the control unit via a data transmission link and to the safety-critical sensor or to the safety-critical actuator device for monitoring the safety-critical sensor device or monitoring and activating the safety-critical actuator device, respectively, and transmitting the safety-critical process data from the I/O unit to the control unit, with the safety-critical process data being protected by means of a diversitary multiple transmission, wherein the safety-critical process data are encoded using a variable encoding algorithm in order to generate variably encoded safety-critical process data, and wherein the variably encoded safety-critical process data are transmitted to the control unit as part of the diversitary multiple transmission.

10. The method of claim 9, wherein the encoding of the safety-critical process data uses a variable keyword that is generated by the control unit and transmitted to the I/O unit.

11. The method of claim 10, wherein the variable keyword is changed for every transmission of safety-critical process data from the I/O unit to the control unit.

12. The method of claims 9, wherein the control unit reads the safety-critical process data cyclically from the I/O unit.

13. The method of claim 9, wherein the I/O unit comprises an actuator output and a separate test unit for the actuator output, with a test result from the test unit being transmitted to the control unit as a process data value.

14. A safety-critical process control apparatus, comprising:
a control unit for processing safety-critical process data relating to the operational state of a remote safety-critical sensor device and/or a remote safety-critical actuator device, at least one I/O unit that is connected to the safety-critical sensor device or to the safety-critical actuator device or monitoring the safety-critical sensor device or monitoring and activating the safety-critical actuator device, respectively, and a data transmission link for connecting the at least one I/O unit to the control unit, the at least one I/O unit generating the safety-critical process data from a signal input received from the device to which it is connected and encoding the safety-critical process data using a variable encoding algorithm in order to generate variably encoded safety-critical process data, such that said variably encoded safety-critical process data repeatedly changes even when there is no change in the safety-critical process data, and the at least one I/O unit being designed to transmit the variably encoded safety-critical process data to the control unit by means of a diversitary multiple data transmission via the data transmission link.

15. The apparatus of claim 14, wherein the at least one I/O unit has an encoder chip for encoding the safety-critical process data with a variable keyword.

16. The apparatus of claim 15, wherein the encoder chip has a hard-wired logic section for encoding the safety-critical process data with the variable keyword.

17. The method of claim 7, wherein said double data transmission of the safety-critical process data comprises first and second data transmissions wherein the second data transmission is different from the first data transmission.

18. The method of claim 1, wherein only one data transmission link is provided for connecting the control unit to the at least one I/O unit.

19. The method of claim 18, wherein said at least one I/O unit comprises a single-channel I/O unit.

20. The method of claim 1, wherein said encoding step is performed by said at least one I/O unit.

21. The apparatus of claim 14, wherein only one data transmission link is connected between the at least one I/O unit and the control unit.

22. The apparatus of claim 21, wherein said at least one I/O unit comprises a single-channel I/O unit.

23. The apparatus of claim 22, wherein said multiple data transmission of said variably encoded safety-critical process data comprises first and second data transmissions wherein the second data transmission is different from the first data transmission.

24. The apparatus of claim 23, further comprising a plurality of I/O units connected to said control unit via said one data transmission link.

* * * * *